US012663363B2

(12) United States Patent
Abbas et al.

(10) Patent No.: US 12,663,363 B2
(45) Date of Patent: Jun. 23, 2026

(54) MULTIPOINT PHOTO-ACOUSTIC MEASURING DEVICE

(71) Applicant: NETA, Talence (FR)

(72) Inventors: Allaoua Abbas, Paris (FR); Yohann Hereau, Bordeaux (FR); Julien Michelon, Bordeaux (FR); Xavier Tridon, Bordeaux (FR)

(73) Assignee: NETA, Talence (FR)

( * ) Notice: Subject to any disclaimer, the term of this patent is extended or adjusted under 35 U.S.C. 154(b) by 293 days.

(21) Appl. No.: 17/756,612

(22) PCT Filed: Nov. 26, 2020

(86) PCT No.: PCT/FR2020/052188
§ 371 (c)(1),
(2) Date: May 27, 2022

(87) PCT Pub. No.: WO2021/105622
PCT Pub. Date: Jun. 3, 2021

(65) Prior Publication Data
US 2023/0003636 A1      Jan. 5, 2023

(30) Foreign Application Priority Data

Nov. 29, 2019    (FR) ...................................... 1913490

(51) Int. Cl.
*G01N 21/17*        (2006.01)
*G01N 21/45*        (2006.01)
G01N 25/72        (2006.01)

(52) U.S. Cl.
CPC ..... *G01N 21/1702* (2013.01); *G01N 21/1717* (2013.01); *G01N 21/45* (2013.01); *G01N 2021/1725* (2013.01); *G01N 25/72* (2013.01)

(58) Field of Classification Search
CPC ........... G01N 21/1702; G01N 21/1717; G01N 21/45; G01N 25/72; G01N 2021/1725
See application file for complete search history.

(56) References Cited

U.S. PATENT DOCUMENTS 4,632,561 A      12/1986    Rosencwaig et al.
5,748,318 A  *  5/1998    Maris ................. G01N 29/0681
                                                            702/170

(Continued)

FOREIGN PATENT DOCUMENTS

CN            1555479 A      12/2004
CN        102721956 A      10/2012

(Continued)

OTHER PUBLICATIONS

Allaoua Abbas: "Développement d'un dispositif pompe-sonde heterodyne : application à l'imagerie en acoustique picoseconde", May 9, 2013 (May 9, 2013), XP055734712, Retrieved from the Internet <URL:https://tel.archives-ouvertes.fr/tel-00988758/document> [retrieved on Sep. 29, 2020.

(Continued)

*Primary Examiner* — Tarifur R Chowdhury
*Assistant Examiner* — Joshua M Carlson
(74) *Attorney, Agent, or Firm* — Paradice & Li LLP

(57)                    ABSTRACT
A method comprises non-destructive contact-free physical characterization of a sample by repeated excitations of the surface of a sample with a sequence of pulses comprising at least one pump pulse by a first "pump" laser followed by a succession of L temporarily offset pulses by a second "probe" laser, and the analysis of the beam emitted by the surface of the sample by an activated photodetector, for the acquisition of signals delivered by the photodetectors during constant time windows.

18 Claims, 3 Drawing Sheets

(56)  References Cited

U.S. PATENT DOCUMENTS

| | | | |
|---|---|---|---|
| 5,781,294 A | 7/1998 | Nakata et al. | |
| 5,982,482 A | 11/1999 | Nelson et al. | |
| 6,411,390 B1 | 6/2002 | Nikoonahad | |
| 7,009,695 B2 | 3/2006 | Some | |
| 7,050,178 B2 | 5/2006 | Morath et al. | |
| 7,130,029 B2 * | 10/2006 | Wack | G03F 7/70658 |
| | | | 356/73 |
| 7,728,317 B2 | 6/2010 | Dilhaire et al. | |
| 7,903,238 B2 | 3/2011 | Mehendale et al. | |
| 9,041,931 B2 | 5/2015 | Colgan et al. | |
| 9,140,601 B2 | 9/2015 | Mehendale et al. | |
| 9,154,223 B2 | 10/2015 | Lewis et al. | |
| 9,576,862 B2 | 2/2017 | Murray et al. | |
| 9,991,176 B2 | 6/2018 | Mehendale et al. | |
| 10,219,700 B1 | 3/2019 | Yang et al. | |
| 10,335,036 B2 | 7/2019 | Yang et al. | |
| 10,578,555 B2 | 3/2020 | Audoin et al. | |
| 11,056,603 B2 | 7/2021 | Huang et al. | |
| 11,058,301 B2 | 7/2021 | Yang et al. | |
| 11,073,500 B2 | 7/2021 | Bingham et al. | |
| 12,092,565 B2 | 9/2024 | Mehendale et al. | |
| 2001/0028460 A1 | 10/2001 | Maris et al. | |
| 2002/0075758 A1 * | 6/2002 | Kushibiki | G01H 3/00 |
| | | | 367/8 |
| 2003/0112451 A1 | 6/2003 | Mautz | |
| 2004/0085540 A1 | 5/2004 | Lapotko et al. | |
| 2004/0174538 A1 | 9/2004 | Opsal et al. | |
| 2004/0188602 A1 | 9/2004 | Chinn et al. | |
| 2004/0196453 A1 * | 10/2004 | Some | G01N 25/72 |
| | | | 356/237.1 |
| 2008/0315131 A1 | 12/2008 | Devos et al. | |
| 2009/0212769 A1 | 8/2009 | Stoica et al. | |
| 2009/0244516 A1 | 10/2009 | Mehendale et al. | |
| 2010/0328670 A1 | 12/2010 | Rotter et al. | |
| 2014/0103188 A1 | 4/2014 | Mehendale et al. | |
| 2014/0268168 A1 * | 9/2014 | Feldman | G02B 23/2484 |
| | | | 356/479 |
| 2015/0226676 A1 | 8/2015 | Nicolaides et al. | |
| 2016/0043008 A1 | 2/2016 | Murray et al. | |
| 2017/0211977 A1 | 7/2017 | Jeys et al. | |
| 2017/0221778 A1 | 8/2017 | Mehendale et al. | |
| 2018/0283950 A1 * | 10/2018 | Ge | G01J 9/04 |
| 2019/0120753 A1 | 4/2019 | Prater et al. | |
| 2019/0313912 A1 | 10/2019 | Alford et al. | |
| 2019/0336057 A1 | 11/2019 | Alford et al. | |
| 2020/0113439 A1 | 4/2020 | Mohseni | |
| 2021/0013356 A1 * | 1/2021 | Huang | G02B 6/12004 |
| 2021/0038305 A1 | 2/2021 | Mirkov et al. | |
| 2021/0080415 A1 | 3/2021 | Baba et al. | |
| 2021/0318270 A1 | 10/2021 | Mehendale et al. | |
| 2022/0113129 A1 | 4/2022 | Golani et al. | |
| 2022/0228973 A1 * | 7/2022 | Mehendale | G01N 21/1702 |
| 2022/0405874 A1 * | 12/2022 | Barbour | G06V 10/762 |
| 2024/0337627 A1 | 10/2024 | Mehendale et al. | |

FOREIGN PATENT DOCUMENTS

| | | | | | |
|---|---|---|---|---|---|
| CN | 110426373 A | * | 11/2019 | | G01N 21/01 |
| CN | 114543685 A | | 5/2022 | | |
| CN | 114562943 A | | 5/2022 | | |
| CN | 115667907 A | | 1/2023 | | |
| CN | 116908126 A | | 10/2023 | | |
| CN | 117012663 A | | 11/2023 | | |
| EP | 0593667 A1 | | 4/1994 | | |
| FR | 2892511 | | 5/2008 | | |
| JP | 1993-172737 | | 7/1993 | | |
| JP | 3200902 B2 | | 8/2001 | | |
| JP | 3510201 B2 | | 3/2004 | | |
| JP | 2005338063 A | | 12/2005 | | |
| JP | 2011180039 A | | 9/2011 | | |
| KR | 10-2009-0048674 A | | 5/2009 | | |
| KR | 20140067793 A | | 6/2014 | | |
| KR | 102262247 B1 | | 6/2021 | | |
| KR | 102583749 B1 | | 9/2023 | | |
| TW | 202235813 A | | 9/2022 | | |
| TW | 202235814 A | | 9/2022 | | |
| WO | 20030006918 A2 | | 1/2003 | | |
| WO | 2007045773 A1 | | 4/2007 | | |
| WO | 2013018813 A1 | | 2/2013 | | |
| WO | 2014149213 A1 | | 9/2014 | | |
| WO | 2018015663 A1 | | 1/2018 | | |
| WO | 2021030454 A1 | | 2/2021 | | |
| WO | 2021105622 A1 | | 6/2021 | | |
| WO | 2021211291 A1 | | 10/2021 | | |
| WO | 2023191801 A1 | | 10/2023 | | |

OTHER PUBLICATIONS

Allaoua Abbas: "Mesurer les propriétés mécaniques de la matière à l'échelle du nanomètre à l'aide de l'acoustique picoseconde", Photoniques, No. 94, Nov. 1, 2018 (Nov. 1, 2018), pp. 30-33, XP055734848, ISSN: 1629-4475, DOI: 10.1051/photon/20189430.

Neta Tech: "JAX-M1", Jan. 1, 2018 (Jan. 1, 2018), XP055735269, Retrieved from the Internet <URL:http://akayin.ipdisk.co.kr/dl/ 3d39f5828db04518ba32703a5b66a0f9/5d5a3ec7/ 657465726e616c3b6479656f/ uDK1RwAJSy4IX60C0hZBPOPCqgjLpdM/Neta-datasheet.pdf> [retrieved on Sep. 30, 2020].

International Search Report for International Application No. PCT/ FR2020/052188 dated Feb. 12, 2021, 3 pages.

Translation of International Written Opinion of the ISA dated Feb. 12, 2021, from PCT Application No. PCT/FR2020/052188, Filed Nov. 26, 2020, 8 pages.

Fengqiang Li et al., "Exploiting wavelength diversity for high resolution time-of-flight 3D imaging," Physics. Optics, Oct. 14, 2020, https://doi.org/10.48550/arXiv.2010.06799.

Liebel, Matz et al., "Widefield phototransient imaging for visualizing 3D motion of resonant particles in scattering environments," Physics. Optics, Aug. 11, 2021, https://doi.org/10.48550/arXiv.2108. 05124.

Lambelet, Patrick et al., "Fast and accurate line scanner based on white light interferometry" Proc. SPIE 8788, Optical Measurement Systems for Industrial Inspection VIII, 87880Q (May 13, 2013), https://spie.org/Publications/Proceedings/Paper/10.1117/12.2020617? SSO=1.

Heliotis, "High-speed Lock-IN CMOS camera with pixel-level signal processing," https://www.swissphotonics.net/libraries.files/ Heliotis_presentation.pdf# :~:text=High-speed%20Lock-IN% 20CMOS%20camera%20with%20pixel-level %20signal% 20processing.,complex%20to%20transfer%20and%20process%20in% 20real%20time.

Christofferson, James et al., "Picosecond Transient Thermal Imaging Using A CCD Based Thermoreflectance System," Proceedings of the 14th International Heat Transfer Conference, IHTC14, Aug. 8-13, 2010, Washington, DC, USA.

Lioe De Xing, "A Study on CMOS Image Sensors for Stimulated Raman Scattering Using High-Speed Lateral Electric Field Charge Modulators," Jun. 2016, http://doi.org/10.14945/00009904.

Patel, Rikesh et al., "Widefield heterodyne interferometry using a custom CMOS modulated light camera," Optics Express, vol. 19, No. 24, Nov. 21, 2011.

Smith, RJ et al., "Parallel detection of low modulation depth signals: application to picosecond ultrasonics," Measurement Science and Technology, vol. 19, No. 5, Mar. 19, 2008, doi: 10.1088/0957-0233/ 19/5/055301.

De Xing Lioe et al., "A Stimulated Raman Scattering CMOS Pixel Using a High-Speed Charge Modulator and Lock-in Amplifier," Sensors (Basel). Apr. 1, 20163;16(4):532. doi: 10.3390/s16040532. PMID: 27089339; PMCID: PMC4851046.

Clement Dupuy. Image Reconstruction for Acousto-Optics: Towards Quantitative Imaging. Physics [physics]. Université Paris Sciences et Lettres, 2017. English. tel-02143103.

Allaoua Abbas et al.. Picosecond time resolved opto-acoustic imaging with 48 MHz frequency resolution. Optics Express, Optical Society of America—OSA Publishing, 2014, 22 (7), pp. 7831-7843. 10.1364/OE.22.007831 hal-01058572.

(56)          References Cited

OTHER PUBLICATIONS

Allaoua Abbas, "Measureing the Mechanical Properties of matter at the nanometer scale using picosecond acoustics," Photonics 94, Dec. 21, 2018, https://doi.org/10.1051/photon/20189430.

Leszek Salbut et al., "Portable profilometer based on low-coherence interferometry and smart pixel camera," Proc. SPIE 7387, Speckle 2010: Optical Metrology, 738714 (Sep. 13, 2010); doi: 10.1117/12. 871532.

International Search Report and Written Opinion date Jul. 26, 2024, from PCT Application No. PCT/US2024/023196, filed Apr. 5, 2024.

International Search Report and Written Opinion dated Sep. 3, 2020, in PCT Application No. PCT/US2020/034350, filed May 22, 2020.

Weinigel et al., "14 Clinical multimodal CARS imaging: Applications in Biology and Medicine." (2018). 10.1515/9783110429985-016.

Thomsen et al., "Coherent Phonon Generation and Detection by Picosecond Light Pulses," Physical Review Letters, vol. 53, No. 10, Sep. 3, 1984.

2013 Optical Metrology Technical Summaries, www.spie.org/om, Munich, Germany, May 13-16, 2013, 153 pages.

Grahn et al., "Picosecond Ultrasonics," IEEE J. Quantum Elect. Vol. 25, No. 12, p. 2562-2569 (1989).

Thomsen et al., "Surface generation and detection of phonons by picosecond light pulses," The American Physical Society, Physical Review B, vol. 34, No. 6, Sep. 15, 1986.

Grimsley et al. "Picosecond Ultrasonic Microscopy of Semiconductor Nanostructures," 1st International Symposium on Laser Ultrasonics, Montreal, CA (2008).

Antonelli et al., "Characterization of Mechanical and Thermal Properties Using Ultrafast Optical Metrology," MRS Bulletin, vol. 31, p. 607-613, Aug. 2006.

Mehendale et al., "Imaging of Overlay and Alignment Markers Under Opaque Layers Using Picosecond Laser Acoustic Measurements," ASMC, 4 pages 2021.

Ramanathan et al., "High-resolution picosecond acoustic microscopy for non-invasive characterization of buried interfaces," J. Mater. Res, vol. 21, No. 5, May 2006, https://doi.org/10.1557/jmr. 2006.0141.

Smith et al., "Overlay metrology at the crossroads," Proc. SPIE 6922, Metrology, Inspection, and Process Control for Microlithography XXII, 692203 (Mar. 22, 2008); doi: 10.1117/12.782035.

Dasari et al., "A comparison of advanced overlay technologies," Proc. SPIE 7638, Metrology, Inspection, and Process Control for Microlithography XXIV, 76381P (Apr. 1, 2010); doi: 10.1117/12. 848189.

International Search Report and Written Opinion dated Jul. 16, 2025, from PCT/US2025/021907.

International Search Report and Written Opinion dated Jul. 17, 2025, from PCT/US2025/023052.

International Search Report and Written Opinion dated Jul. 17, 2025, from PCT/US2025/023055.

International Preliminary Report on Patentability dated Oct. 16, 2025, from PCT/US2024/023196.

International Search Report and Written Opinion dated Jul. 23, 2024, from PCT Application No. PCT/US2024/021082.

International Preliminary Report on Patentability dated Oct. 9, 2025, from PCT Application No. PCT/US2024/021082, filed Mar. 22, 2024.

* cited by examiner

MULTIPOINT PHOTO-ACOUSTIC MEASURING DEVICE

CROSS-REFERENCE TO RELATED APPLICATIONS

This application is a national phase entry under 35 U.S.C. § 371 of International Patent Application PCT/FR2020/052188, filed Nov. 26, 2020, designating the United States of America and published as International Patent Publication WO 2021/105622 A1 on Jun. 3, 2021, which claims the benefit under Article 8 of the Patent Cooperation Treaty to French Patent Application Serial No. FR1913490, filed Nov. 29, 2019.

TECHNICAL FIELD

The present disclosure relates to the field of non-destructive contact-free characterization of a mechanical and/or physico-chemical property of a sample, by analysis of the acoustic wave produced by an interaction with pump and probe laser beams.

BACKGROUND

The technical field is more particularly that of photo-acoustics, in particular, the ultra-fast, non-destructive measurement of the mechanical, thermal, or optical properties of a sample (solid, liquid, or gaseous inert matter or living cell). "Ultra-fast measurement" means a measurement having a temporal resolution on the order of a picosecond.

The pump-probe method makes it possible to use very short laser pulses to measure ultra-fast phenomena in matter, such as the movement of atoms or the excitation of electrons.

For this, a very short and intense laser pulse, the "pump," is sent to a sample to excite it. A second weaker pulse, the "probe," is sent immediately after, which makes it possible to measure the effect of the initial excitation. By repeating and modifying the time between the first and the second pulse, it is thus possible to reconstruct the evolution of the excitation over time and to make a recording over a time window of a measurement of the light intensity in the photodetector or of the number of photons counted by the photodetector.

The absorption of a first so-called "pump" laser pulse causes sudden heating and therefore surface expansion, which, depending on the geometry of the object studied, either propagates in the form of an acoustic pulse lasting a few picoseconds or excites the resonant vibrations of the system. The acoustic pulses or vibrations are detected using a second time-delayed pulse (by optical method in the case of the homodyne only), "the probe," by the interferometric measurement of the changes in the optical reflectivity coefficient induced by transient sound waves.

The field of picosecond acoustics has developed in recent years and has enabled the study of the elastic properties of thin films, multilayer systems, nanostructures and nanoparticles, the detection of stress and disorder phenomena at interfaces, adhesion measurement, etc.

Picosecond acoustics have also been used for the study of massive systems. At the same time, industrial applications in the field of non-destructive evaluation in the microelectronics industry have emerged and led to the development of commercial measuring devices.

In the prior art, the article "Measuring the mechanical properties of matter at the nanometer scale using picosecond acoustics" PHOTONIQUES N°94, Nov. 1, 2018, page 30)33 XP055734848, the article by Allaoua Abbas "Development of a heterodyne pump-probe device" of May 9, 2013 XP055734712, as well as the thesis "Development of a heterodyne pump-probe device: application to picosecond acoustic imaging" defended by Allaoua Abbas on May 9, 2014 (https://tel.archives-ouvertes.fr/tel-00988758/document) are known.

This document describes the operating principle of a heterodyne bench. Two pump and probe pulse trains, issued from different lasers, are combined (RO) before being focused on the sample being studied by which they are reflected and then directed toward a photodetector using suitable optics. The rejection of the pump signal diffused by the sample is done either using polarizers, if the polarizations of the beams have been kept crossed, or using an interferometric filter, if the wavelengths of the pump and the probe are quite separated. Alternatively, a non-polarizing beam splitter may be used.

The difference $\Delta f$, called the beat frequency, between the repetition frequency of the probe $f_{Probe}$ and pump $f_{Probe}+\Delta f$ trains, increasingly delays the probe pulses with respect to the pump pulses. At each pump excitation, the pump-probe delay increases by the quantity $\delta_{het}$, the value of which is given by the relationship:

$$\delta_{het}=T_{probe}-T_{pump},$$

where $\tau_{probe}$ and $\tau_{pump}$ are, respectively, the periods of the probe and pump lasers. $\delta_{het}$ may also be expressed as a function of $f_{probe}$ and $\Delta f$ using the formula:

$$\delta_{het} = \frac{\Delta f}{f_{probe}(\Delta f + f_{probe})}$$

The delay increases until the pump and probe pulses again arrive at the same instant on the sample. This precise moment is called coincidence. The time between two coincidences is the time it takes for the probe to go through all the pump-probe delays. This time is called the beat period, and its value is given by the inverse of the beat frequency $\Delta f$. The transient signal obtained by studying the variation of the intensity of the probe collected by the photodetector during a beat period thus corresponds to the response of the sample dilated in time. This dilation of the time scale is similar to the stroboscopic effect, observable on a macroscopic scale, and which, under certain conditions, makes it possible to freeze or slow down movements of a periodic nature.

The relationship that binds the temporal scale of the dilated time $\tau_{diluted}$, which corresponds to the time scale of the acquisitions, and the physical time scale $T_{physical}$, which corresponds to the true dynamics of the sample, is:

$$T_{physical} = \frac{\Delta f \cdot T_{dilated}}{f_{master}}$$

Two delays may be defined:

The first in dilated time, $\Delta\tau_{het}$, corresponds to the time between the coincidence and the moment when the reflectivity value of the probe is read.

The second in physical time, $\delta\tau_{het}$, corresponds to the time between the probe and the pump excitation preceding it.

The interaction with the material results in the formation of acoustic waves with high spectral content, which allows the characterization of samples with nanometric dimensions by a photodetector. Differential detection makes it possible to partly overcome the fluctuation of the intensity of the probe laser. Moreover, this makes it possible to bring the levels of the average signals back to the neighborhood of 0 and to take advantage of the minimum step for quantifying the acquisition map.

This thesis also proposes a solution for imaging a surface of a sample by controlling the relative positions of the focal spots of the pump and the probe on the sample. This control makes it possible to mesh the space around an excitation in order to map the transient phenomena generated by the excitation.

Also known is the Neta TECH article "JAX-M1" January 2018 XP055735269 as well as the Japanese patent JP H05172737.

The French patent FR2892511 is also known, which describes a heterodyne optical sampling device equipped with two pulsed laser sources capable of emitting, respectively, a pump beam and a probe beam of respective repetition frequencies Fs and Fp with Fs≠Fp, an element combining the pump and probe beams intended to be sent to a sample and which comprises a signal channel including a system for the photodetection of the response signal of the sample and connected to this signal channel, and a system for acquiring the response signal. It is mainly characterized in that, as the acquisition system comprises an acquisition triggering element, it comprises, connected to this triggering element, a synchronization channel including a device for measuring the beat frequency IFs-Fpl.

Finally, the United States patent application publication US2004/196453 is known, which relates to a laser probe and a thermal pump to form a complete image used to detect defects under the surface.

The solution proposed in the prior art has multiple drawbacks resulting from the scanning used for the deflectometry and the generation of surface waves (measurement of the transverse properties of the material).

A first drawback, recognized in the document, is the difficulty of controlling the movements at such high frequencies, and of maintaining synchronization between the pulse trains and the photodetection.

A second drawback lies in the analysis times induced by these scans, which are indicated in the thesis as being able to reach several hours. Such durations are hardly compatible with industrial use, for example, for sample control in a production cycle.

Such durations are downright prohibitive for the analysis of samples having a very short lifespan, for example, an isolated living cell, the lifespan of which does not exceed a few minutes.

Finally, the point interaction leads to local information that does not take into account the mechanical, chemical, and physical links with the neighboring local areas and which, as a result, provide a type of characterization of a surface of the sample, which is both disturbed by the remanence of neighboring pulses and by the absence of consideration of the global characteristics of the analyzed surface.

In summary, the problem encountered by the person skilled in the art is to be able to construct one or more maps (1D in one dimension or 2D in two dimensions) representative of the physical properties (mechanical, thermal, or optical) of various samples, in time frames compatible with operational requirements such as: compliance with production line inspection rates, non-alteration of the sample under the transient conditions necessary for measurement, reduction of measurement times, increase in the quantities of data collected.

BRIEF SUMMARY

In order to remedy these drawbacks, the present disclosure relates, in its most general sense, to a method for the non-destructive contact-free physical characterization of a sample by repeated excitations of the surface of a sample with a sequence of laser pulses comprising at least one pump pulse by a first "pump" laser followed by a succession of L temporally offset pulses by a second "probe" laser, and the analysis of the beam emitted by the surface of the sample by an activated photodetector, for the acquisition of the signals delivered by the photodetectors during constant time windows, Characterized in that the pump and probe beams have a uniform spatial distribution of the "top hat" type along N dimensions, N being equal to one or two, the detector is constituted by an N-dimensional array of M photodetectors, with M greater than 2, the method comprises recording, for each sequence, an array $M_{PD}$ of M×L signal values delivered by each of the photodetectors before and after the probe pulse, and before the following pump pulse, and applying at least one digital processing to the array to establish a map of the sample zone analyzed by the detector in the form of an array $M_{cc}$ of the values of the physical characteristic observed for Q points of the zone analyzed, Q being between 1 and M.

The duration of the laser pulses is between a picosecond and a femtosecond, and preferably on the order of a hundred femtoseconds.

Preferably, the digital processing comprises applying a transformation array $M_{TR}$ to the array of M×L signal values delivered by the photodetectors to determine the array $M_{cc}$.

According to an advantageous embodiment, the method includes steps for recalculating the array $M_{TR}$ through supervised learning.

According to a variant, the method includes the recording of a plurality of transformation arrays $M_{TR}$, each corresponding to a particular physical characteristic.

According to another particular embodiment, the method further includes a step for the automatic optimization of the focus of the optics of the "pump" and "probe" beams comprised of controlling a sequence of variation of the focusing and measurement of a quality factor of the signal produced by the photodetector, and selecting the focusing corresponding to a maximization of the quality factor over all of the recorded values.

Another approach is measurement with a point pump centered or not on the probe line to allow the surface wave acquisition.

The present disclosure relates secondly to equipment for the non-destructive contact-free physical characterization of a sample comprising two pulsed laser sources for the emission, respectively, of a "pump" beam and a "probe" beam, as well as a detector characterized in that it further includes at least one device for shaping a beam to transform the distribution of the "pump" and "probe" beams into a uniform spatial distribution of the "top hat" type along N dimensions, N being equal to one or two, and in that the detector consists of an N-dimensional array of M photodetectors, each measuring the number of photons before and after the probe pulse, and before the following pump pulse, with M greater than 2.

According to a first variant, the pump and probe beams are coaxial in the zone of interaction with the sample.

According to a second variant, the pump beam is perpendicular to the plane of the zone of interaction with the sample, and the probe beam forms an angle other than 90° with the plane of the zone of interaction with the sample.

According to a particular embodiment, the equipment according to the present disclosure includes a computer for controlling the recording, for each sequence, of an array $M_{PD}$ of M×L signal values delivered by the photodetectors and for applying at least one digital processing to the array to establish a map of the zone of the sample analyzed by the detector in the form of an array $M_{CC}$ of the values of the physical characteristic observed for Q points of the analyzed zone, Q being between 1 and M, depending on at least one transformation array stored in a computer memory.

The present disclosure relates thirdly to a computer memory device for the customization of physical characterization equipment including a recording of a digital transformation array $M_{TR}$ to the array of M×L signal values delivered by the photodetectors to determine the array $M_{CC}$.

Fourthly, the present disclosure relates to the application of the aforementioned method for N-dimensional mapping, with N equal to 1 or 2, of the thickness of a coating layer of a sample, including thin opaque, semi-transparent, and transparent layers the Young's modulus of a sample, the adhesion strength of a sample, the crystalline state of a sample.

The combination of optical images obtained by an optical camera with photoacoustic imagery.

BRIEF DESCRIPTION OF THE DRAWINGS

Other features and advantages of the present disclosure will be evident from the following detailed description, given by way of non-limiting example and with reference to the accompanying drawings, in which.

DETAILED DESCRIPTION

Figure 1:
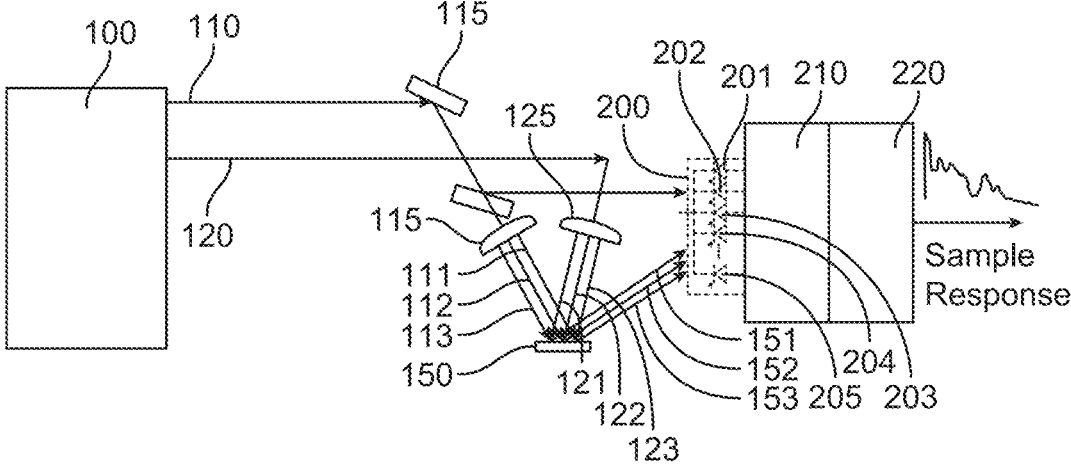
FIG. 1 is a schematic view of the measurement system.

The present disclosure combines the use of a pump beam for excitation and a probe beam for detection, which are generated by a synchronous or asynchronous system with a device for shaping the beams in a line or in a square array, then an acquisition means of the probe beam before and after disturbance by the sample. The acquisition is carried out by probe signal discretization of n points by a photodetector with an element array with subtraction from the signal after disturbance of the signal before disturbance, then by the digitization of the differential signal and the temporal reconstruction of the sample response.

The equipment for mapping a physical characteristic of a sample according to the present disclosure, described by way of example, comprises a system (100) of two laser sources producing two beams (110, 120), a pump beam (120) and a probe beam (110) offset temporally with possible adjustment of the delay.

The pump beam (120) has a form factor in a line or in a square array form, with a non-Gaussian form ("top hat beam").

The probe beam (110) has a form factor in a line or in a square array form, identical to the pump beam.

A "top hat" type of beam exhibits an almost uniform fluence (energy density) in a circular disc. It is generally formed of diffractive optical elements from a Gaussian beam. It may be obtained by combining a beam profiler ("laser beam profiler") with a picosecond laser or a femtosecond laser.

The system further includes a differential photodetector (200) with an element array (201 to 205) in line or in a square array form measuring at each of its points the difference of the signals before and after disturbance of the incident probe beam on the sample. It optionally allows, as a variant, the output of the respective average values of the outward and return signals in order to balance the respective averages of the outward and return signals on a single reference value. The electrical signals delivered by the elements (201 to 205) are transmitted to a pre-processing circuit (210) then to a digital analog digitizer (220) making it possible to record the response signals measured by the photodetector (200).

A preferred configuration illustrated in FIG. 1 involves placing the pump (111 to 113) and probe (121 to 123) beams at any angle of incidence with respect to the sample interaction plane (150), the angle between the two beams being between 0° and 180°. A particular case of this configuration appears when the angle of incidence of the probe (121 to 123) with respect to the normal of the sample (150) is 0°.

In this case it is necessary to add a certain number of optical elements.

Similarly, when the angle between the probe (121 to 123) and pump (111 to 113) beams is 0°, it is necessary to add an optical element (130) allowing the beams to recombine with each other.

The system comprises a synchronous or asynchronous device (100) making it possible to generate two pulsed laser beams (110,120) offset temporally, a Probe beam (110) and a Pump beam (120). The wavelengths of the beams are independent; for the Probe beam (110) the wavelengths are comprised within the spectral band of the photodetector (200).

The Pump beam (120), coming from an asynchronous or synchronous device, passes through an optical device (125) for shaping the beam (120). At the output of the device, the beam has a shape adapted to the sensor array of the photodetector and a uniform distribution of energy over its entire surface (so-called "top hat" shape of the signal).

The Probe beam (110), coming from an asynchronous or synchronous device (100), passes through a sampling optic, which makes it possible to sample a fraction of power to send it to one of the element arrays of the differential photodetector (200) with an element array (201 to 205). Initially, the probe beam passes through an optical beam shaping device (115). At the output of the device, the beam has a shape adapted to the sensor array of the photodetector (200) and a uniform distribution of energy over its entire surface (so-called "top hat" shape of the signal).

Figure 2:
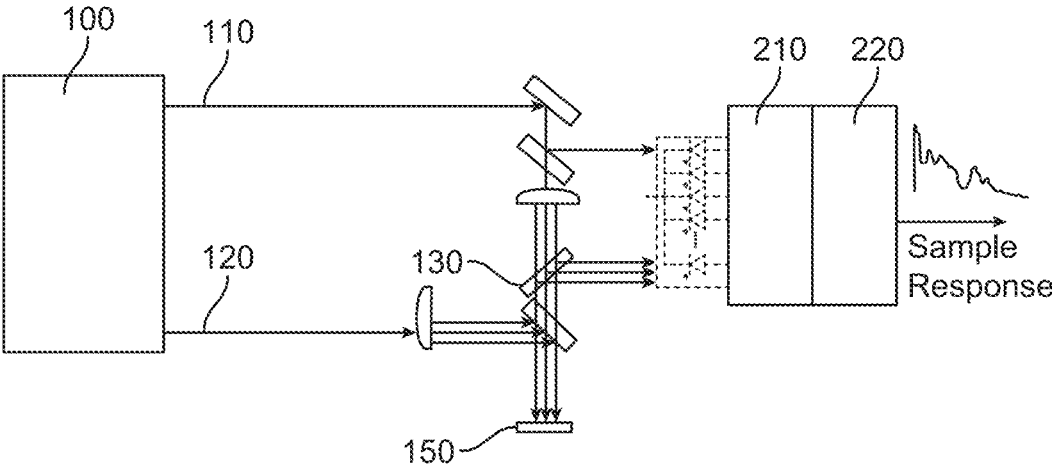
FIG. 2 is a schematic view of a particular normal incidence configuration.

Then, in the case of the configuration with a normal incidence of the probe beam (110) on the sample (150) illustrated in FIG. 2, the probe beam passes through semi-reflecting optics.

Then, in the case of an angle of 0° between the pump (120) and probe (110) beams, the beams are recombined in a recombination optic making it possible to give them a single orientation on the sample (150).

Finally the two beams (110, 120) are focused on the sample via an optical focusing device. In the case of a configuration with non-normal incidence of the probe beam on the sample, the probe beam passes through two different optical focusing devices, the paths before and after the sample not being similar, the semi-reflecting optics are not used in this configuration.

The probe beam reflected or transmitted (151 to 153) by the sample (150) is then injected into the differential photodetector (200) with an element array (201 to 205). The element array (201 to 205) of the photodetector (200) discretizes the signal into n signals.

Afterwards, these signals are subtracted from the probe signal measured before reflection or transmission of the probe beam on the sample. The signals are conditioned and then digitized by the multi-channel A/D digitizer (220). In addition, the digitizer (220) is synchronized with the laser sources (100) to allow a temporal reconstruction of the n responses of the sample (150) by digital processing of the measurements.

In the case of a normal incidence of the probe channel on the sample (150), the probe beam reflected or transmitted (151 to 153) by the sample (150) is reflected by the semi-reflecting optics in the differential photodetector (200) with an element array. The element array (201 to 205) of the photodetector discretizes the signal into n signals. Then these signals are subtracted from the probe signal measured before reflection or transmission of the probe beam on the sample (150). The signals are conditioned and then digitized by the multi-channel A/D digitizer (220). In addition, the digitizer is synchronized with the laser sources to allow a temporal reconstruction of the n responses of the sample by digital processing of the measurements.

The differential photodetector (200) with an element array (201 to 205) comprises an array of photosensitive elements, which may range up to 64 elements distributed in a row or arranged in an 8×8 square. The spectral response of these photo elements (201 to 205) makes it possible to cover a spectral band ranging from 190 to 1700 nm. The functions covered by the photodetector are:

Current/voltage conversion: This function (trans-impedance assembly) makes it possible to convert weak currents generated by the photosensitive elements into a usable voltage. There are as many current/voltage conversion modules as there are photosensitive elements.

Subtraction: This function makes it possible to recover the useful signal, i.e., the response of the sample by taking the difference of the signal before sampling and the signals after sampling; only the disturbances generated by the sample remain in the signal.

Signal conditioning: used to format the signals before acquisition by the digitizer.

The probe (110) and pump (120) beams may be offset spatially on the sample (150) in order to measure transverse physical phenomena.

The scanner system may be made with two movable mirrors or by means of two lenses, the first of which is off-centered with respect to the second.

Photodetector

Figure 3:
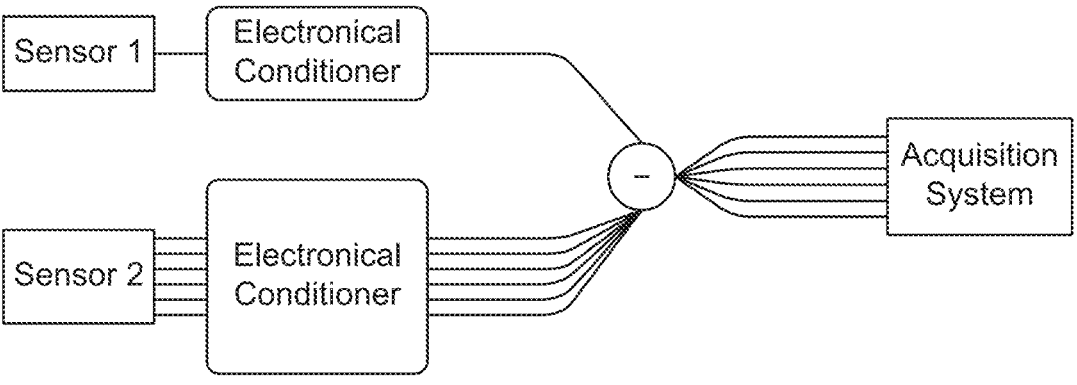
FIG. 3 is a detailed schematic view of the array photodetector.
Figure 4:
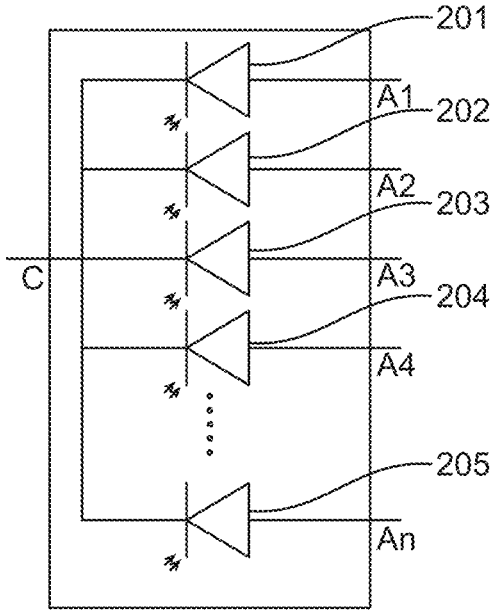
FIG. 4 is a schematic view of an array of photo-sensitive elements.
Figure 5:
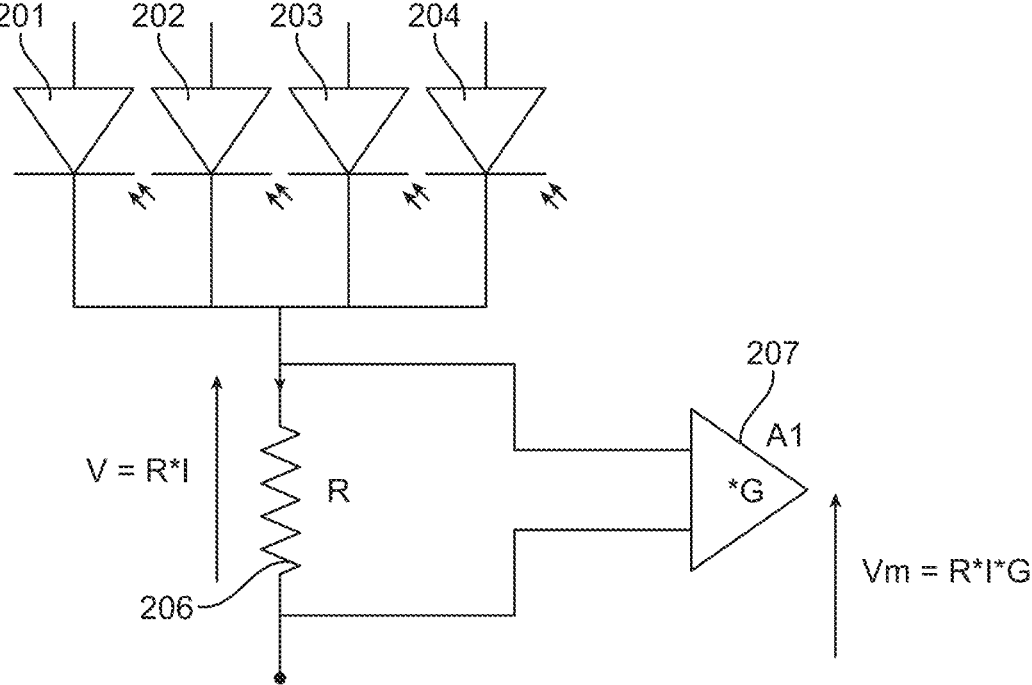
FIG. 5 is a schematic view of the photodetector monitoring.

FIGS. 3 to 5 illustrate the diagram of the photodetector (200).

The array photodetector (200) may be equipped with channels for monitoring the optical powers making it possible to visualize the average optical power of the probe before and after sampling in order to balance the differential channels of the detector and to optimize the signals. The advantage of line/square sensors is that the elements have a common cathode.

The current passing through the cathode is the sum of all the currents generated by each photosensitive element (201 to 205). Current flowing through the resistor R (206) creates a voltage across its terminals. This voltage is amplified using an amplifier (207) to obtain a voltage proportional to the optical power on the in-line sensor. Only one monitoring will therefore be necessary for the line/square sensor.

The photodetector (200) is equipped with an array of n photosensitive elements on the return sample path and a single photosensitive element or an array of n elements on the sampling channel before the sample. The currents generated are then converted into voltage before obtaining the difference between the signals.

The signals may be multiplexed at the photodetector output in order to limit the number of digitizer channels.

Signal Processing

The digitized signals are recorded in a table made up of the values of each of the elements (201 to 205), for the different moments of the probe pulses, which may be represented in the form of a set of light intensity curves measured by the photodetector or the number of photons counted by the photodetector with respect to time. These have a maximum value corresponding to the zero offset between the pump pulse and the first probe pulse, then generally decreasing values.

These curves are processed to extract characteristic information such as singular points or the slope of certain segments.

This digital array is processed by a transformation array associating the digital values from the photodetector (200) with the values of the physical characteristic studied. This transformation array may be built empirically, or by supervised learning. It may be reassessed regularly as a function of the results of the measurements taken.

This transformation array may be recorded on a device to allow the customization of mapping equipment, for example, by access to an online memory or in the form of a physical memory that may be inserted into a connector provided for this purpose in the equipment.

Applications

The equipment according to the present disclosure is suitable for different applications:

Non-destructive testing of structural patterns of surfaces or successive layers of samples.

Imaging of living cells, which are inherently moving, which, in particular, prohibits the use of long "poses."

Characterization and mapping of nanoparticles on a substrate, number, size, and distribution.

Imaging of phenomena of homogeneity variation of the physical properties of a sample following a brief and non-reproducible event. For example, development of the thermal conductivity of thin layers during laser machining.

Surface wave imaging without moving the probe relative to the pump.

The invention claimed is:

1. A non-destructive and contact-free method for physical characterization of a sample, comprising:

repeatedly exciting a surface of the sample with pump and probe beams comprising a sequence of pulses, the sequence of pulses comprising at least one pump pulse produced by a pump laser followed by a plurality of L probe pulses produced by a probe laser, the plurality of L probe pulses having different temporal offsets with respect to the at least one pump pulse;

receiving, with a photodetector, the plurality of L probe pulses in the sequence of pulses after interacting with the surface of the sample;

wherein:

the photodetector comprises an N-dimensional array of a plurality of M photosensitive elements, wherein N is one or two; and for each photosensitive element of the plurality of M photosensitive elements, a signal value is determined based on a signal produced by the photosensitive element in response to one probe pulse after the one probe pulse interacts with the surface of the sample;

recording, for each sequence of pulses, an array of MxL signal values delivered by the plurality of M photosensitive elements; and applying a transformation to the array of MxL signal values to determine a map of a zone of the sample in a form of an array of values of a physical characteristic observed for at least one point of the zone.

2. The method of claim 1, further comprising determining the transformation through supervised learning.

3. The method of claim 1, further comprising determining a plurality of transformations, each corresponding to a particular physical characteristic.

4. The method of claim 1, further comprising automatically optimizing a focus of optics for the pump and probe beams on the sample by controlling a sequence of variation of focusing and measuring a quality factor of the signal values produced by the photodetector, and selecting the focus corresponding to a maximization of the quality factor over the signal values.

5. A system for non-destructive and contact-free physical characterization of a sample, comprising:

two pulsed laser sources configured to emit respectively a pump beam comprising at least one pump pulse and a probe beam comprising a plurality of L probe pulses, wherein the plurality of L probe pulses have different temporal offsets with respect to the at least one pump pulse;

a detector configured to receive probe pulses after interacting with a surface of the sample, the detector comprising an N-dimensional array of a plurality of M photosensitive elements, wherein N is one or two, and wherein, for each photosensitive element of the plurality of M photosensitive elements, signal values are determined based on signals produced by the photosensitive element in response to the plurality of L probe pulses after interacting with the surface of the sample; and a computer configured to control a recording of an array of MxL signal values delivered by the plurality of M photosensitive elements and to apply a transformation to the array of MxL signal values to determine a map of a zone of the sample in a form of an array of values of a physical characteristic observed for at least one point of the zone.

6. The system of claim 5, wherein the pump beam and the probe beam are coaxial in a zone of interaction with the sample.

7. The system of claim 5, wherein the pump beam is perpendicular to a plane of a zone of interaction with the sample, and the probe beam forms an angle other than 90° with the plane of the zone of interaction with the sample.

8. The system of claim 5, further comprising memory storing the transformation for applying to the array of MxL signal values to determine the array of values of the physical characteristic observed for the at least one point of the zone.

9. The method of claim 1, further comprising determining an N-dimensional mapping of a thickness of a coating layer of a sample, wherein N is 1 or 2.

10. The method of claim 1, further comprising determining an N-dimensional mapping of a Young's modulus of a sample, wherein N is 1 or 2.

11. The method of claim 1, further comprising determining an N-dimensional mapping of an adhesion strength of a sample, wherein N is 1 or 2.

12. The method of claim 1, further comprising determining an N-dimensional mapping of a crystalline state of a sample, wherein N is 1 or 2.

13. The method of claim 1, wherein the sequence of pulses comprise a plurality of pump pulses, wherein each pump pulse in the plurality of pump pulses is followed by a single probe pulse and each pair of pump pulse and probe pulse have a different temporal offset.

14. The method of claim 13, wherein the pump laser and the probe laser are synchronous and have different repetition frequencies to produce the different temporal offsets.

15. The method of claim 1, wherein each pump pulse and each probe pulse has a duration of less than a femtosecond.

16. The system of claim 5, wherein the pump beam comprises a plurality of pump pulses, wherein each pump pulse in the plurality of pump pulses is followed by a single probe pulse and each pair of pump pulse and probe pulse have a different temporal offset.

17. The system of claim 16, wherein the two pulsed laser sources are synchronous and have different repetition frequencies to produce the different temporal offsets.

18. The system of claim 5, wherein each pump pulse and each probe pulse has a duration of less than a femtosecond.

* * * * *